Dec. 6, 1932.   H. WHITWORTH   1,890,424
BRAKE LINING AND METHOD OF MAKING
Filed Dec. 19, 1930
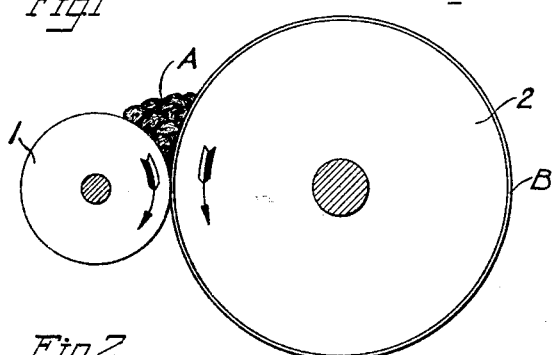
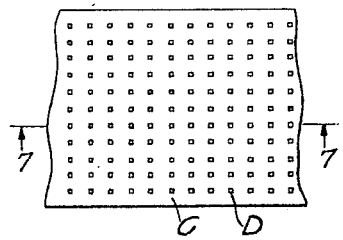
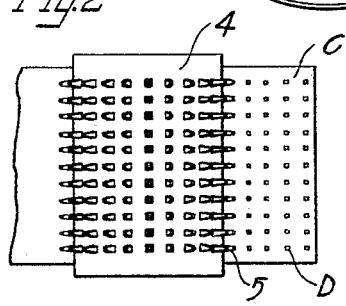
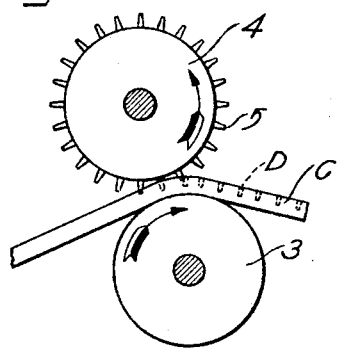
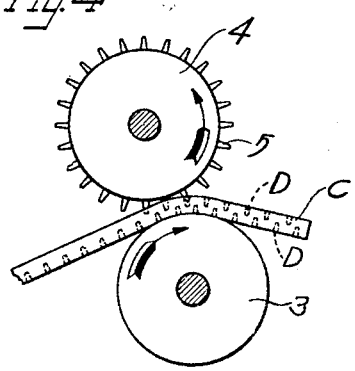
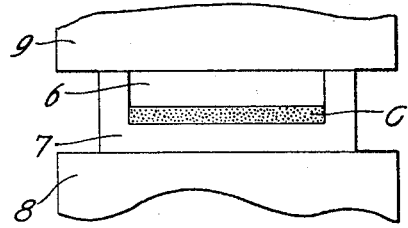
Inventor
Harry Whitworth
By S. Jay Teller
Attorney Patented Dec. 6, 1932

1,890,424

UNITED STATES PATENT OFFICE

HARRY WHITWORTH, OF HARTFORD, CONNECTICUT, ASSIGNOR TO COLT'S PATENT FIRE ARMS MANUFACTURING CO., OF HARTFORD, CONNECTICUT, A CORPORATION OF CONNECTICUT

BRAKE LINING AND METHOD OF MAKING

Application filed December 19, 1930. Serial No. 503,512.

The invention relates particularly to a brake lining or equivalent material and to a method of making the same, wherein the brake lining comprises unwoven fibrous material mixed with or embedded in a binder cured or adapted to be cured by heat. Preferably the major portion of the fibers are substantially parallel with each other and with the surfaces of the lining.

A brake lining made in accordance with the invention is a relatively thin sheet or strip, and is of such character as to avoid any tendency to split or separate into laminations prior to or during use and also to avoid any tendency to produce interior pockets or surface blisters prior to or during use. The brake lining has increased flexibility and other important advantages which will be apparent from the following specification and claims.

The accompanying drawing shows my improved brake lining and also indicates diagrammatically some of the method steps which are preferably used in producing the brake lining. It will be understood that the drawing is for illustrative purposes only and is not to be construed as defining or limiting the scope of the invention, the claims forming a part of this specification being relied upon for that purpose.

Of the drawing:

Fig. 1 is a diagrammatic view illustrating the first step of the method, which step is the forming of the material into a sheet.

Figs. 2 and 3 are diagrammatic plan and side views illustrating the method step of indenting the brake lining at one surface thereof.

Fig. 4 is a view similar to Fig. 3 and illustrating the method step of indenting the lining at the other surface thereof.

Fig. 5 is a diagrammatic view illustrating the final step of curing the indented lining by heat and pressure.

Fig. 6 is a plan view showing a fragment of brake lining embodying the invention.

Fig. 7 is a longitudinal sectional view taken along the line 7—7 of Fig. 6.

Fig. 8 is an enlarged view similar to Fig. 7 but showing more clearly the novel arrangement of the fibers of the fibrous material.

In practicing the method of my invention I initially prepare and mix a plastic mass which comprises a quantity of shredded fibrous material, such as asbestos, a binder adapted to be cured by the action of heat and a liquid including a readily vaporizable solvent for at least a portion of the binder. I do not narrowly limit myself as concerns the character of the binder, but ordinarily and preferably the binder consists at least in part of unvulcanized rubber. It will be understood that the initial mixture also includes a quantity of sulphur and such other substances as may be found necessary or desirable for the effective and rapid curing or vulcanizing of the rubber. The character of the solvent which has been mentioned will depend upon the binder which is used, but when the binder consists at least in part of rubber the solvent liquid will ordinarily include gasolene or naphtha. A sufficient quantity of the liquid is provided to form a mass which upon completion of the mixing operation is still soft and readily workable.

In addition to the rubber, the binder may also include an artificial resin, ordinarily of the phenolic condensation type. This material is adapted to be cured by the action of heat preferably applied while the material is under pressure. The artificial resin is initially in a final comminuted state and is intimately mixed with the fibrous material and with the rubber to form a part of the plastic mass.

After the initial plastic mass has been prepared and mixed, it is formed into a sheet. Preferably it is transferred to a roll sheeting machine of the type indicated diagrammatically in Fig. 1. The machine comprises two rotatable rolls 1 and 2 which are preferably of different sizes but which are so connected that their surface speeds are the same. One of the rolls, ordinarily the smaller roll 1, is adjustable with respect to the other roll and the initial adjustment is such that the two rolls are very close together. A quantity of the plastic mixture is placed between the rolls at A and portions of this material adhere to the larger roll 2 which is suitably heated. In this way there is formed a very thin layer of material on the roll 2. The adjustable roll 1 is then very slowly withdrawn allowing successively superposed layers of the material at A to adhere to the roll 2 so as to form a sheet B thereon, this operation being continued until the sheet B attains the desired thickness. When the sheet B is built up slowly as is preferred the successive increments which constitute the sheet are withdrawn from the general mass A in such a way that the fibers of the fibrous material are, in the main, arranged circumferentially of the roll 2 and parallel with each other. It will be recognized that the formation of the sheet B as thus far described is in accordance with a process well known to those skilled in this art, and which for convenience will be identified as the "layer-accretion" process.

During the building up of the sheet B as already described care is taken to maintain the material at a temperature below the temperature which is necessary for the complete curing of the binder. When the binder comprises both synthetic resin and rubber the temperature is below the temperature required for the complete curing of the resin and below the temperature required for the vulcanizing of the rubber.

In accordance with the invention the forming of the sheet B is very carefully timed and controlled with respect to the vaporization of the solvent liquid. It is necessary to form the sheet sufficiently slowly to permit the major portion of the liquid in each successively applied layer to be vaporized or evaporated before the next layer is applied. This is necessary in order to avoid an excessive quantity of liquid in the sheet at the time of the subsequent heating of the sheet for the purpose of curing the binder. Excess liquid, if allowed to remain in the sheet, would be vaporized by the heat during curing, thus causing blistering which if extensive would render the resultant product entirely useless. While it is necessary for the reasons stated to effect vaporization of the major portion of the solvent liquid while the sheet B is being formed, it is also necessary to avoid a complete vaporization thereof, as it is essential for the binder in each layer to remain sufficiently plastic to readily adhere to and unite with the binder in the immediately superposed layer. Obviously if the operation were carried on so slowly as to permit each layer to become completely dry before the addition of the next layer, there would result a sheet consisting merely of thin separable laminations, which sheet would not be satisfactory for the required purpose. From the foregoing, it will be apparent that the sheeting operation must be so controlled and timed as to permit the vaporization of the major portion of the solvent liquid without, however, permitting the vaporization of all of the liquid. In other words, a small portion of the liquid is permitted to remain in the sheet B at the conclusion of the formation thereof.

After the sheet has been completed as described on the roll machine, it is removed from the roll 2 and prepared for a drying operation to effect the complete removal of the retained solvent liquid. When the sheet material is to be used for brake linings, it is cut into strips of the proper width to form the required linings, the strips preferably being so cut that the fibers of the fibrous material will extend longitudinally of the strips. I do not necessarily limit myself as to the sequence of operations insofar as concerns the cutting into strips. This may take place upon the completion of the sheet on the roll machine, or it may take place later on after one or another of the other steps to be now described.

In order to facilitate drying and to obtain other advantageous results as hereinafter more fully described, I form in the sheet, at least at one surface thereof, a large number of narrow vents or indentations which are closely and substantially uniformly spaced, these indentations being formed subsequently to the completion of the sheet on the roll machine and prior to the drying procedure. The vents or indentations preferably extend only partially through the sheet, ordinarily approximately to the central plane thereof. While the vents or indentations may be formed at only one surface of the sheet they are preferably formed at both of the opposite surfaces thereof. The shape of the vents or indentations may be widely varied but I prefer and have shown them in the form of perforations. It will be understood that by perforations I mean vents or indentations which are narrow not only in one direction but in two directions at right angles to each other. As shown the perforations are square in cross section but I do not limit myself to this particular shape.

In Figs. 2 and 3 I have illustrated the method step of indenting or perforating the sheet or strip. It may be assumed that the sheet B has been cut into strips C, and Figs. 2 and 3 show one of these strips being passed between two rolls 3 and 4. The roll 3 is a smooth surfaced supporting roll and the roll 4 is provided with a large number of small closely spaced and substantially uniformly distributed prick points 5, 5 which are adapted to form corresponding perforations or vents D, D in one surface of the strip C. The spacing between the adjacent perforations or vents may be considerably varied, but I prefer a spacing as shown which roughly approximates the thickness of the lining. While there may be considerable departure from the preferred spacing, the spacing must not be so great as to leave broad areas of the lining which are not immediately adjacent one or more vents. I do not narrowly restrict myself as to the size of the perforations or vents, but they are preferably of such small size that the tensile strength and surface areas of the sheet or strip are reduced to only a minimum extent. In the drawing I have shown the prick points 5, 5 arranged in transverse and circumferential rows on the roll 4, this arrangement producing perforations or vents D, D which are arranged in transverse and longitudinal rows on the strip C. This particular arrangement of the prick points and of the vents is a convenient one, but the invention is not so limited.

After the formation of the perforations or vents in the strip C as illustrated in Figs. 2 and 3, the strip is subjected to a drying operation which preferably takes place in a vacuum in order that the complete vaporization of the solvent liquid may be effected while maintaining the strip at a temperature below the curing temperature of the binder. This drying operation, carried on at a relatively low temperature and preferably in a vacuum, completely vaporizes the solvent liquid which remains in the strip. The vapor in the portions of the strip immediately adjacent the surfaces thereof is expelled through the said surfaces and the vapor in the interior portions of the strip can reach one or another of the several vents D, D through which it can readily escape.

After the completion of the described drying operation the strip is preferably again perforated at the opposite surface thereof as shown in Fig. 4 and is again subjected to a drying operation similar to that already described. The indentations or perforations at one surface of the sheet are preferably longitudinally offset relatively to those at the opposite surface. This offsetting or staggering of the perforations minimizes any reduction in tensile strength of the sheet or strip.

If desired the first drying operation may be omitted and the sheet may be perforated on both sides and then dried by a single operation. This procedure, while effective, is not quite so satisfactory as that first described, as the vents in one surface of the strip may become partly closed by the supporting roller during the perforating or venting of the other surface of the strip.

Following the drying operation or operations which have been described, the strip may then be used as a brake lining, dependence being placed upon the heat developed during actual use to effect the final vulcanization of the rubber and the final curing of the resin if used. In view of the fact that the perforations or vents have made it possible for complete drying to take place, there is no tendency whatsoever toward the formation of interior pockets of surface blisters when heating takes place. Even if the strip had been incompletely dried the closely spaced perforations would nevertheless prevent the formation of any large interior pockets or surface blisters. Any vapor that might tend to create such a pocket or blister would escape through the nearest vent without doing any serious damage.

While, as stated, the material may be used as a brake lining without preliminary curing, I prefer to subject it to a controlled curing operation which involves the application of heat preferably combined with suitable pressure. When both heat and pressure are used for curing, the strip, after perforating and drying, is placed in a mold which is mounted in a suitable press so as to be heated to the proper temperature when pressure is applied. Fig. 5 shows an end view of the strip C, this strip being held between two mold parts 6 and 7. These mold parts are forced into the position shown by the bed and platen of a press indicated diagrammatically at 8 and 9. The final heating and pressing operation not only effects the curing and vulcanizing of the resin and the rubber, but also serves to smooth the edges of the strip which may be slightly rough as the result of the cutting operation and to smooth the surfaces of the strip which may be slightly uneven as the result of the perforating operation.

As the result of the described method, there is produced a fibrous sheet which is particularly adapted for use as a brake lining and which has several important advantages. When the sheet is built up slowly as has been described, the major portion of the fibers of the fibrous material are arranged substantially parallel with each other and with the surfaces of the sheet. As the result of the proper timing and control of the formation of the sheet, the binder is of substantially homogeneous character throughout and is free from any internal areas of reduced strength, such as might result if one layer were permitted to become dry or substantially dry before the next layer is added. On account of this homogeneous character of the binder there is no tendency for the lining to split into laminations, any effort to effect such splitting being resisted by the strong homogeneous binder. Furthermore, by reason of the thorough drying of the lining prior to the final curing of the binder, there are no internal pockets or surface blisters such as would result from the vaporization during curing of excess solvent liquid retained in the sheet. Any such pockets or blisters would greatly weaken the lining, and if they existed in too great numbers would render it entirely useless.

The indentations or perforations or vents in the lining are useful not only for the purpose of effecting complete drying of the material, as already described, but also for providing other important advantages. It will be obvious that the perforations serve as breathers to permit the escape of any residual vapor or gas that might be released in case of overheating of the brake lining during use. The perforations are particularly useful when the brake is applied in the presence of excessive moisture. If there is a film of water between the brake lining and the drum this tends to serve as a lubricant and effective braking can be obtained only by squeezing out this film. With a brake lining embodying my invention the water constituting the film is forced into the perforations as pressure is applied and it is, therefore, not necessary for it to pass across the lining entirely to the edges thereof.

The indentations or perforations have the further advantage of making the lining somewhat more flexible than it otherwise would be, thus adapting it to be readily curved to conform to the curvature of the brake drum. The perforations facilitate the necessary expansion of the brake lining at one face thereof and the necessary compression at the opposite face thereof. Without the perforations there would be a tendency during bending or flexing for the material adjacent the concave surface to crush or buckle and form transverse ridges which would be very objectionable. The perforations permit adjustments of the material to conform to the bending, the perforations at the convex surface being slightly enlarged and the perforations at the concave surface being slightly reduced.

I have pointed out that with a brake lining embodying my invention the major portion of the fibers of the fibrous material are arranged substantially parallel with each other and with the surfaces of the lining. This primary arrangement of the fibers which exists when the sheet is first formed is somewhat changed as the result of the indenting or perforating step which has been described. As the several prick points 5, 5 enter the material they engage the adjacent fibers and displace them, causing the said fibers, which are adjacent the resultant perforations, to lie more or less transversely of the sheet instead of longitudinally thereof. It will be observed that at the time the perforating is effected the binder is still in the uncured state and therefore adjusts itself to accommodate the new positions of the fibers surrounding the perforations. I have already stated that the binder itself, by reason of its homogeneous character, serves to resist splitting of the lining into laminations. The major portions of the fibers which lie parallelly with the surfaces of the sheet are obviously of little or no value as concerns resisting splitting and, except at the perforations, the homogeneous binder must be relied upon for this purpose. At the said perforations, however, the fibers extend more or less crosswise, that is, at substantial angles to the said surface, and therefore interlock with the binder and with other fibers at different planes throughout the thickness of the sheet. These angularly extending fibers therefore materially assist the binder itself in resisting splitting of the lining into laminations. This arrangement of the fibers is clearly shown in Fig. 8.

What I claim is:

1. A thin flexible brake lining sheet or strip, comprising unwoven fibrous material and a binder adapted to be cured by heat, which lining has therein numerous small narrow indentations extending inward from at least one surface thereof and of such small size that the tensile strength and surface areas of the sheet or strip are reduced to only a minimum extent, the spacing between adjacent indentations roughly approximating the thickness of the lining.

2. A thin flexible brake lining sheet or strip, comprising unwoven fibrous material and a heat cured binder and having therein numerous small perforations extending only partially therethrough from at least one surface thereof, the said perforations being substantially uniformly distributed and closely spaced both transversely and longitudinally.

3. A thin brake lining strip, comprising unwoven mineral fibers and a binder adapted to be cured by heat which lining has therein numerous narrow indentations extending only partially therethrough from the two opposite surfaces thereof, the said indentations adjacent each surface being closely and substantially uniformly spaced.

4. A thin flexible brake lining sheet or strip, comprising unwoven fibrous material and a heat cured binder and having therein numerous small perforations extending only partially therethrough from the two opposite surfaces thereof, the said perforations adjacent each surface being substantially uniformly distributed and closely spaced both transversely and longitudinally.

5. A thin flexible brake lining strip, comprising unwoven fibrous material and a heat cured binder and having therein numerous small perforations extending only partially therethrough from the two opposite surfaces thereof and of such small size that the tensile strength and surface areas of the strip are reduced to only a minimum extent, the said perforations adjacent each surface being substantially uniformly distributed and closely spaced both transversely and longitudinally and the said perforations at one surface being longitudinally offset relatively to those at the opposite surface.

6. A sheet brake lining, comprising unwoven fibrous material and a heat cured binder. the major portion of the fibers of the said fibrous material being arranged substantially parallelly with each other and with the surfaces of the lining, and the said lining having vents permitting the escape of gases or vapors from the interior thereof, with the result that it is of substantially homogeneous character throughout and free from internal areas of reduced strength and is thus adapted to resist splitting of the lining into laminations.

7. A flexible brake lining strip consisting of unwoven mineral fibers and a binder adapted to be cured by heat, a predominating portion of the mineral fibers being substantially parallel with each other and with the surfaces of the lining, and the said strip having therein numerous narrow indentations extending only partially therethrough from at least one surface thereof which indentations are spaced apart by distances roughly approximating the thickness of the lining.

8. A flexible brake lining strip consisting of sheet material of the type formed on a roll-machine by the layer-accretion process and comprising unwoven fibrous asbestos and a plastic binder adapted to be cured by heat, the major portion of the individual fibers of the asbestos being substantially parallel with each other and with the surfaces of the sheet, and the said strip having therein small closely spaced and substantially uniformly distributed perforations extending only partially therethrough from at least one surface thereof.

9. A flexible brake lining strip consisting of sheet material of the type formed on a roll-machine by the layer-accretion process and comprising unwoven fibrous asbestos and a plastic binder adapted to be cured by heat, the major portion of the individual fibers of the asbestos being substantially parallel with each other and with the surfaces of the sheet, and the said strip having therein numerous narrow indentations extending only partially therethrough from the two opposite surfaces thereof which indentations are closely and substantially uniformly spaced and are arranged with those at one surface longitudinally offset relatively to those at the opposite surface.

10. A sheet brake lining, comprising unwoven fibrous material and a heat cured binder and having therein numerous indentations extending inward from at least one surface thereof which indentations are closely and substantially uniformly spaced, the fibers of the fibrous material except those adjacent the said indentations being arranged substantially parallelly with each other and with the surfaces of the lining and the said fibers adjacent the indentations being positioned at substantial angles to the said surfaces and thus serving to resist splitting of the lining into laminations.

11. A flexible brake lining sheet, comprising unwoven fibrous material and a heat cured binder and having therein small closely spaced and substantially uniformly distributed perforations extending inward from at least one surface thereof, the fibers of the fibrous material except those adjacent the said perforations being arranged substantially parallelly with each other and with the surfaces of the lining and the said fibers adjacent the perforations being positioned at substantial angles to the said surfaces and thus serving to resist splitting of the lining into laminations.

12. A sheet brake lining as set forth in claim 5, wherein there are perforations extending inward from both surfaces of the lining and wherein the fibers adjacent all of the perforations are positioned at substantial angles to the said surfaces.

13. A sheet brake lining, comprising unwoven fibrous material and a heat cured binder and having therein small closely spaced and substantially uniformly distributed perforations extending inward from the opposite surfaces thereof, the said binder being of substantially homogeneous character throughout and free from internal areas of reduced strength and being thus adapted to resist splitting of the lining into laminations and the fibers of the fibrous material except those adjacent the said perforations being arranged substantially parallelly with each other and with the surfaces of the lining and the said fibers adjacent the perforations being positioned at substantial angles to the said surfaces and thus serving to additionally resist splitting of the lining into laminations.

14. The hereindescribed method for making a fibrous sheet, which consists in preparing and mixing a plastic mass comprising fibrous material, a binder adapted to be cured when heated to a prescribed curing temperature and a readily vaporizable liquid including a solvent for at least a portion of the binder, forming from the mass while below the said curing temperature a sheet of the required thickness, forming in the sheet at least at one surface thereof a large number of narrow vents which are closely and substantially uniformly spaced, and thereafter drying the sheet at a temperature below the said curing temperature so as to vaporize the solvent liquid and expel it from the surface portions of the sheet and from the interior portions thereof through the said vents, thus preparing the sheet for subsequent curing without blistering.

15. The hereindescribed method for making a fibrous sheet, which consists in preparing and mixing a plastic mass comprising fibrous material, a binder adapted to be cured when heated to a prescribed curing temperature and a readily vaporizable liquid including a solvent for at least a portion of the binder, forming from the mass while below the said curing temperature a sheet of the required thickness, forming in the sheet at least at one surface thereof numerous small perforations which are substantially uniformly distributed and closely spaced both transversely and lonigtudinally, and thereafter drying the sheet at a temperature below the said curing temperature so as to vaporize the solvent liquid and expel it from the surface portions of the sheet and from the interior portions thereof through the said vents, thus preparing the sheet for subsequent curing without blistering.

16. The hereindescribed method for making a fibrous sheet, which consists in preparing and mixing a plastic mass comprising fibrous material, a binder adapted to be cured when heated to a prescribed curing temperature and a readily vaporizable liquid including a solvent for at least a portion of the binder, forming from the mass while below the said curing temperature a sheet of the required thickness, forming in the sheet at the opposite surfaces thereof large numbers of narrow indentations which are closely and substantially uniformly spaced, and drying the sheet at a temperature below the said curing temperature so as to vaporize the solvent liquid and expel it from the surface portions of the sheet and from the interior portions thereof through the said vents, thus preparing the sheet for subsequent curing without blistering.

17. The hereindescribed method for making a fibrous sheet, which consists in preparing and mixing a plastic mass comprising fibrous material, a binder adapted to be cured when heated to a prescribed curing temperature and a readily vaporizable liquid including a solvent for at least a portion of the binder, forming from the mass while below the said curing temperature successively superposed layers which firmly adhere to each other to form a homogeneous incompletely dried sheet of the required thickness, forming in the sheet at least at one surface thereof a large number of narrow vents which are closely and substantially uniformly spaced, and thereafter drying the sheet at a temperature below the said curing temperature so as to vaporize the solvent liquid and expel it from the surface portions of the sheet and from the interior portions thereof through the said vents, thus preparing the sheet for subsequent curing without blistering.

18. The hereindescribed method for making a fibrous sheet, which consists in preparing and mixing a plastic mass comprising fibrous material, a binder adapted to be cured when heated to a prescribed curing temperature and a readily vaporizable liquid including a solvent for at least a portion of the binder, forming from the mass while below the said curing temperature successively superposed layers which firmly adhere to each other to form a homogeneous incompletely dried sheet of the required thickness, perforating the sheet at least at one surface thereof to provide small closely spaced and substantially uniformly distributed vents, and thereafter drying the sheet at a temperature below the said curing temperature so as to vaporize the solvent liquid and expel it from the surface portions of the sheet and from the interior portions thereof through the said vents, thus preparing the sheet for subsequent curing without blistering.

19. The hereindescribed method for making a fibrous sheet, which consists in preparing and mixing a plastic mass comprising fibrous material, a binder adapted to be cured when heated to a prescribed curing temperature and a readily vaporizable liquid including a solvent for at least a portion of the binder, forming from the mass while below the said curing temperature successively superposed layers which firmly adhere to each other to form a homogeneous incompletely dried sheet of the required thickness, perforating the sheet at least at one surface thereof to provide small closely spaced and substantially uniformly distributed vents, thereafter heating the sheet to a temperature below the said curing temperature so as to vaporize the solvent liquid and expel it from the surface portions of the sheet and from the interior portions thereof through the said vents thus effecting complete drying of the sheet, and finally heating the sheet to the said prescribed curing temperature so as to effect curing of the binder.

20. The hereindescribed method of making a fibrous sheet, which consists in preparing and mixing a plastic mass comprising asbestos fibre, rubber and a readily vaporizable liquid including a solvent for the rubber, forming from the mass while below the rubber vulcanizing temperature successively superposed layers which firmly adhere to each other to form a homogeneous incompletely dried sheet of the required thickness, perforating the sheet at least at one surface thereof to provide small closely spaced and substantially uniformly distributed vents, thereafter heating the sheet to a temperature below the said vulcanizing temperature so as to vaporize the solvent liquid and expel it from the surface portions of the sheet and from the interior portions thereof through the said vents thus effecting complete drying of the sheet, and finally heating the sheet to the said temperature required to effect vulcanizing of the rubber.

21. The hereindescribed method for making a fibrous sheet, which consists in preparing and mixing a plastic mass comprising fibrous material, a binder adapted to be cured when heated to a prescribed curing temperature and a readily vaporizable liquid including a solvent for at least a portion of the binder, forming from the mass while below the said curing temperature successively superposed layers which firmly adhere to each other to form a homogeneous incompletely dried sheet of the required thickness, forming in the sheet at the opposite surfaces thereof large numbers of narrow indentations which are closely and substantially uniformly spaced, and thereafter drying the sheet at a temperature below the said curing temperature so as to vaporize the solvent liquid and expel it from the surface portions of the sheet and from the interior portions thereof through the said vents, thus preparing the sheet for subsequent curing without blistering.

22. The method as set forth in claim 19, wherein indentations are formed in the sheet as described first at one surface and then at the other, and wherein the sheet is heated to the said vaporizing temperature after the first and before the second indenting operation and is again so heated after the second indenting operation.

23. The hereindescribed method of making sheet brake lining, which consists in preparing and mixing a plastic mass comprising asbestos fiber, synthetic resin, rubber and a readily vaporizable liquid including a solvent for the rubber, forming from the mass while below the curing and vulcanizing temperatures for the resin and the rubber successively superposed layers which firmly adhere to each other to form a homogeneous incompletely dried lining sheet of the required thickness, perforating the lining at least at one surface thereof to provide small closely spaced and substantially uniformly distributed vents, and thereafter heating the lining to a temperature below the said curing and vulcanizing temperatures so as to vaporize the solvent liquid and expel it from the surface portions of the lining and from the interior portions thereof through the said vents thus effecting complete drying of the lining and preparing it for subsequent curing and vulcanizing without blistering.

24. The hereindescribed method of making sheet brake lining, which consists in preparing and mixing a plastic mass comprising asbestos fibre, synthetic resin, rubber and a readily vaporizable liquid including a solvent for the rubber, forming from the mass while below the curing and vulcanizing temperatures for the resin and the rubber successively superposed layers which firmly adhere to each other to form a homogeneous incompletely dried lining sheet of the required thickness, perforating the lining at least at one surface thereof to provide small closely spaced and substantially uniformly distributed vents, thereafter heating the lining to a temperature below the said curing and vulcanizing temperatures so as to vaporize the solvent liquid and expel it from the surface portions of the lining and from the interior portions thereof through the said vents thus effecting complete drying of the lining, and finally subjecting the lining simultaneously to heat and pressure to effect curing and vulcanizing of the resin and rubber.

In testimony whereof I have hereunto set my hand this 18th day of December, 1930.

HARRY WHITWORTH.

CERTIFICATE OF CORRECTION.

Patent No. 1,890,424.  December 6, 1932.

HARRY WHITWORTH.

It is hereby certified that error appears in the printed specification of the above numbered patent requiring correction as follows: Page 3, line 65, for "of" read "or"; page 5, line 79, claim 12, for "5" read "11"; page 7, line 18, claim 22, for "19" read "21"; and that the said Letters Patent should be read with these corrections therein that the same may conform to the record of the case in the Patent Office.

Signed and sealed this 10th day of January, A. D. 1933.

(Seal)

M. J. Moore.
Acting Commissioner of Patents.